(12) United States Patent
Schippl et al.

(10) Patent No.: US 7,681,435 B2
(45) Date of Patent: Mar. 23, 2010

(54) ARRANGEMENT FOR MONITORING THE LEAK-TIGHTNESS OF AN EVACUATED SPACE

(75) Inventors: Klaus Schippl, Hannover (DE); Friedrich Harten, Stadthagen (DE); Christian Frohne, Hannover (DE)

(73) Assignee: Nexans, Paris (FR)

( * ) Notice: Subject to any disclaimer, the term of this patent is extended or adjusted under 35 U.S.C. 154(b) by 13 days.

(21) Appl. No.: 12/012,610

(22) Filed: Feb. 4, 2008

(65) Prior Publication Data

US 2008/0203669 A1    Aug. 28, 2008

(30) Foreign Application Priority Data

Feb. 5, 2007    (EP)    ................. 07290146

(51) Int. Cl.
   *G01M 3/08*    (2006.01)
   *G01M 3/18*    (2006.01)
(52) U.S. Cl. ............ 73/49.1; 73/40; 73/40.5 R; 73/49.5
(58) Field of Classification Search ............ 73/40–49.8
   See application file for complete search history.

(56) References Cited

U.S. PATENT DOCUMENTS

| 3,299,417 | A | * | 1/1967 | Sibthorpe | .................... 340/605 |
|---|---|---|---|---|---|
| 3,423,990 | A | * | 1/1969 | Martin | ........................ 73/45.1 |
| 3,438,246 | A | * | 4/1969 | Lotti | ............................. 73/40 |
| 3,862,646 | A | * | 1/1975 | Tarsha | ........................ 138/104 |
| 4,014,213 | A | * | 3/1977 | Parquet | ..................... 73/290 R |
| 4,511,162 | A | * | 4/1985 | Broyles | ........................ 285/93 |
| 4,603,576 | A | * | 8/1986 | Spencer | .......................... 73/40 |
| 6,374,863 | B1 | * | 4/2002 | Friederich | ................... 138/104 |
| 6,478,051 | B1 | * | 11/2002 | Drumm et al. | ................. 138/30 |
| 7,387,012 | B2 | * | 6/2008 | Spaolonzi et al. | ............ 73/49.1 |
| 7,461,541 | B2 | * | 12/2008 | Adams et al. | ............ 73/40.5 R |
| 7,509,841 | B2 | * | 3/2009 | Spaolonzi et al. | ............ 73/49.1 |
| 2004/0177891 | A1 | * | 9/2004 | Spaolonzi et al. | ........... 138/104 |
| 2004/0231741 | A1 | * | 11/2004 | Kraus et al. | ................. 138/104 |

FOREIGN PATENT DOCUMENTS

WO    02081956    10/2002

* cited by examiner

*Primary Examiner*—David A. Rogers

(57) ABSTRACT

An arrangement for monitoring the leak-tightness of an evacuated space which is hermetically closed, leak-tight, by means of at least one metallic wall is specified. A device which is connected to the evacuated space indicates an inadmissible pressure rise in the evacuated space caused by a leak in the wall. The device includes a metallic bellows, which is hermetically connected, leak-tight, to the evacuated space, and an electrical proximity switch to which an evaluation unit is connected. The proximity switch (7) is mounted, in the direction of movement of the bellows (5), at a distance from the end face of the latter, the size of which is varied as a function of the respective axial length of the bellows (5). A tube (9) connected fixedly to the wall (2) is mounted around the bellows (5), so as to maintain an air gap, surrounds the bellows (5) in a moisture-tight manner and is longer than the bellows (5) in its longest initial position corresponding to the expanded state. The proximity switch (7) projects into the tube (9) so as to be sealed off with respect to the latter.

3 Claims, 1 Drawing Sheet

US 7,681,435 B2

ARRANGEMENT FOR MONITORING THE LEAK-TIGHTNESS OF AN EVACUATED SPACE

RELATED APPLICATION

This application claims the benefit of priority from European Patent Application No. 07290146.5, filed on Feb. 5, 2007, the entirety of which is incorporated by reference.

FIELD OF THE INVENTION

The invention relates to an arrangement for monitoring the leak-tightness of an evacuated space which is hermetically closed, leak-tight, by means of at least one metallic wall, in which is inserted a device which is connected to the evacuated space and which indicates an inadmissible pressure rise in the evacuated space caused by a leak in the wall, and in which the device consists of a metallic bellows, which is hermetically connected, leak-tight, to the evacuated space, and of an electrical proximity switch to which an evaluation unit is connected (DE 101 17 329 A1).

BACKGROUND

An "evacuated space" basically may be any hermetically-sealed off space in which a more or less high vacuum is to be maintained. Such an evacuated space, referred to below as "vacuum space", may, for example, be part of a container or of a pipe, or a pipeline for carrying a cooled medium, for example, a low-temperature liquid gas, around which is mounted a vacuum insulation closed off outwardly by means of a metallic tube and operated under a vacuum. The vacuum space with vacuum insulation may also be the interspace between two concentric metal tubes of a cryostat for superconductive cables. Further statements relate to vacuum insulation of this type as representing all other possibilities of use.

In order to detect leakage, referred to below as, in brief, a "leak", in the "envelope" of a vacuum space, a response threshold of a few kPa is sufficient. Pressures in the region of $10^{-3}$ Pa are customary for vacuum insulation. The vacuum insulation largely loses its effectiveness in the region of 0.1 Pa. If a leak occurs in the outer tube delimiting the vacuum insulation, a pressure of approximately $10^5$ Pa is reached after a short time, whereas in the case of a leak in the inner tube, a pressure of, for example, up to 2 MPa, corresponding to the operating pressure, may occur after a short time.

To monitor the pressure in a vacuum space, it is known to use a friction vacuum gauge which has a ball which is located in a small tube connected to the vacuum space and which is brought into suspension and set in rotation from outside by means of external magnetic fields. The friction of this ball with respect to the surrounding gas is dependent on the pressure of the latter. It can be determined by means of corresponding evaluation electronics as a measure of the pressure or of the residual pressure in the vacuum space. The outlay is very high on account of the measuring instruments required.

The known arrangement according to DE 101 117 329 A1 mentioned in the introduction is a pipe-break protection for a vacuum-insulated filling line. Connected to the filling line is a bellows which is closed off by means of a contact plate and around which is arranged a guide tube which is axially shorter than the bellows in the expanded initial position. In the operating position, the contact plate of the then shortened bellows bears against the end face of the guide tube. The contact plate is connected to a pneumatic or electrical contact maker. In the event of a pressure loss in the vacuum insulation of the filling line, the bellows expands. At the same time it takes up the contact plate which is thereby moved away from the contact maker, so that the latter is no longer activated. The supply of a cryogenic medium to the filling line is then interrupted. This known arrangement can be employed only restrictedly or even not at all for use outside buildings, because the bellows is not protected against environmental influences and may easily ice up.

OBJECTS AND SUMMARY

The object on which the invention is based is to design the arrangement outlined in the introduction such that it can be used unrestrictedly even outside buildings.

This object is achieved, according to the invention, in that the proximity switch is mounted, in the direction of movement of the bellows, at a distance from the end face of the latter, the size of which is varied as a function of the respective axial length of the bellows, in that a tube connected fixedly to the wall is mounted around the bellows, so as to maintain an air gap, surrounds the bellows in a moisture-tight manner and is longer than the bellows in its longest initial position corresponding to the expanded state, and in that the proximity switch projects into the tube so as to be sealed off with respect to the latter.

This arrangement has a very simple set-up and requires no complicated measuring instruments. Merely a commercially available metallic bellows is connected to the vacuum space, for which purpose a correspondingly large orifice has to be formed in its wall, for example, a metallic tube. When the bellows is evacuated from inside together with the vacuum space, it is shortened. If a leak occurs in the wall of the vacuum space, the pressure in the latter rises, and the bellows expands in the direction of its initial position which corresponds to the expanded state and which it assumed before evacuation. This is detected by the proximity switch which may be a commercially available proximity switch. When the bellows reaches a specific preset position in the event of an undesirable pressure rise in the vacuum space, this is indicated in an evaluated way by the proximity switch. The tube surrounding the bellows in a moisture-tight manner is of essential importance in this arrangement. This tube does not impede the movement of the bellows, since an air gap is left all round. The tube is designed to be axially of a length such that it even projects beyond the bellows in its greatest length which corresponds to the initial position in the expanded state. The tube projects beyond the bellows to an extent such that the proximity switch is also at least partially surrounded and sealed off with respect to the tube. The bellows and the relevant part of the proximity switch are thus protected by the tube, even against rough environmental conditions, such as rain and dirt, and an icing-up of the bellows may be ruled out.

BRIEF DESCRIPTION OF DRAWINGS

An exemplary embodiment of the subject of the invention is illustrated in the drawing, in which.

DETAILED DESCRIPTION

Figure 1:
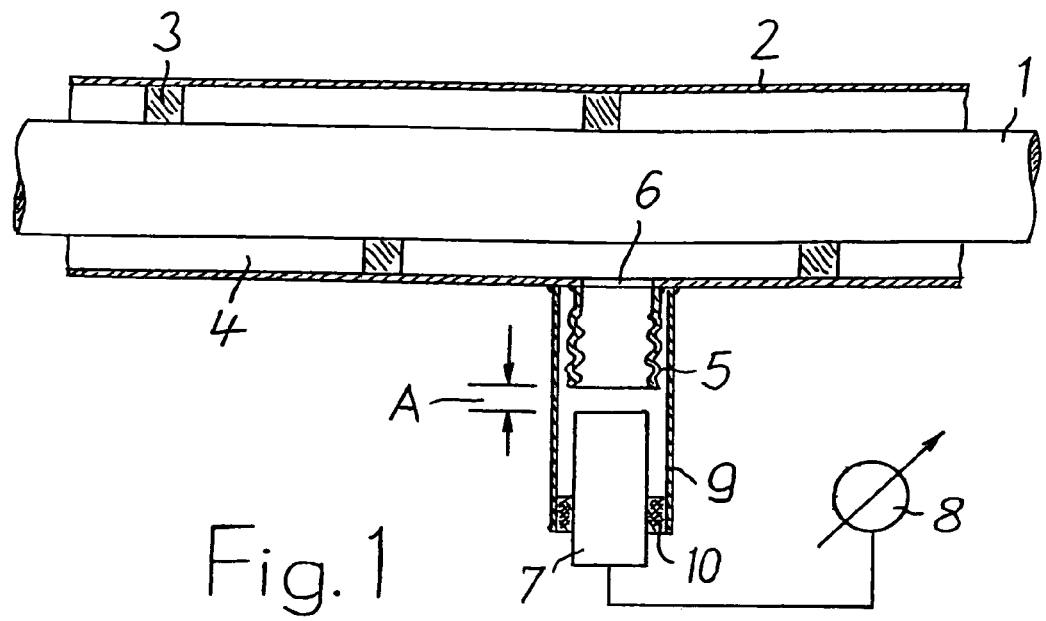
FIG. 1 shows diagrammatically a section through a pipeline surrounded by a vacuum space, with a connected arrangement according to the invention in its initial position.

The invention is explained below by the example of a pipeline, again as representing all other possibilities of use outlined in the introduction.

Designated by 1 is a pipe, consisting, for example, of high-grade steel, of a pipeline, around which pipe, for example, an outer pipe 2 likewise consisting of high-grade steel is arranged coaxially and at a distance. The two pipes 1 and 2 are held in their mutual position by means of spacers 3. The hermetically sealed-off interspace between the two pipes 1 and 2 forms a vacuum space 4 which is evacuated in order to form a vacuum insulation of the pipeline.

A bellows 5 projecting, for example, radially from the outer pipe 2, is hermetically connected, leak-tight, to the latter, specifically via a hole 6 located in the outer pipe 2. The bellows 5 may likewise consist of high-grade steel with a wall thickness of between, for example, 0.1 mm and 0.4 mm. Another material may, however, also be used for the bellows 5, such as, for example, copper or a glass-fibre-reinforced plastic.

An electrical proximity switch 7, merely indicated diagrammatically, is arranged at a distance from the bellows 5 in the axial direction of the latter and is connected to an evaluation unit 8. The proximity switch 7 is advantageously a commercially available proximity switch which may operate inductively or capacitively. The evaluation unit 8 may be an only indicating instrument. It may, however, advantageously also be coupled to an alarm device.

Figure 2:
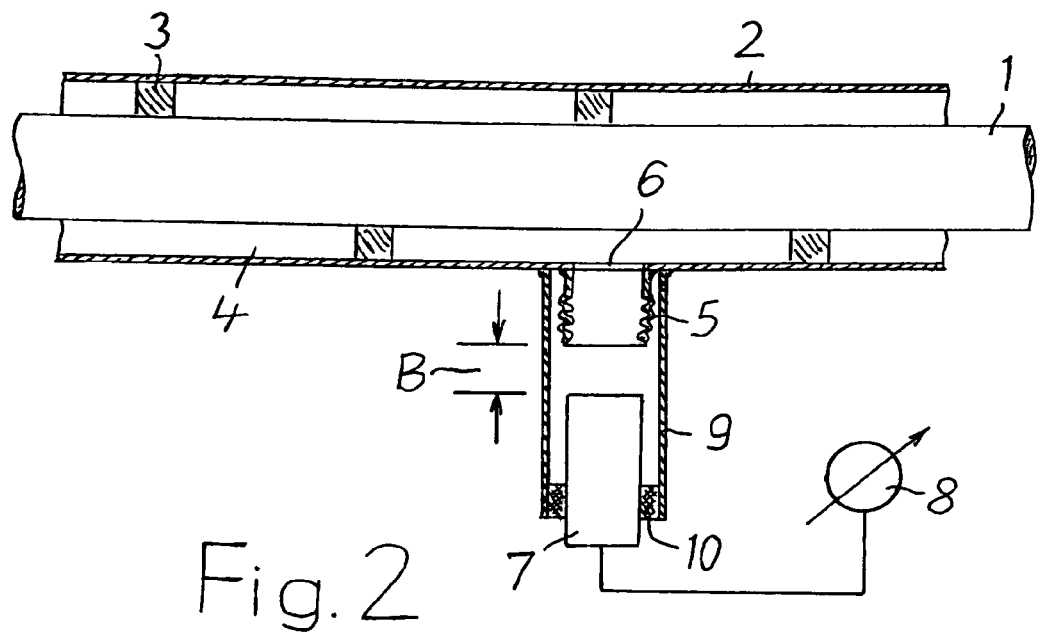
FIG. 2 shows the pipeline with the arrangement being in the working position.

FIG. 1 illustrates the bellows 5 in its initial position which corresponds to its expanded state in which the vacuum space 4 is not yet evacuated. It is separated, in this initial position, from the proximity switch 7 by a clearance A. When a vacuum is generated in the vacuum space 4, the bellows 5 is likewise evacuated. As a result, it is gradually compressed by the external pressure and consequently shortened. This working position of the bellows 5 is shown in FIG. 2. In this working position, it is separated from the proximity switch 7 by a larger clearance B than the clearance A.

Arranged around the bellows 5 is a tube 9 which is connected fixedly, and leak-tight, to the outer pipe 2 and which is preferably welded as a metallic tube to the latter. The tube 9 is axially longer than the bellows 5 in its greatest length shown in FIG. 1. It is separated by a continuous air gap from the bellows 5 so that the axial movability of the latter is not impeded. The tube 9 is of a length such that it at least partially even also surrounds the proximity switch 7. The proximity switch 7 is sealed off with respect to the tube 9 by means of a sealing element 10. The bellows 5 and proximity switch 7 are thus surrounded, moisture-tight, by the tube 9 and thereby, where appropriate, protected against climatic influences.

After the fastening of the bellows 5 and tube 9 to the outer pipe 2, the proximity switch 7 is positioned. For this purpose, the latter is activated and, for example, screwed into the tube 9, then provided with an internal thread, until the proximity switch 7 responds. The latter is then moved nearer to the bellows 5 to an extent such that the latter is detected. For safety reasons, the proximity switch 7, after responding, is brought somewhat nearer to the bellows 5, so that its response is ensured in any event when the bellows 5 expands in the case of a pressure rise when the arrangement is in operation. This position of the proximity switch 7 corresponds to that illustrated in FIG. 1, with the clearance A, important for the response threshold of the vacuum monitoring, between the bellows 5 and proximity switch 7. In the version of the arrangement, as outlined here, the screw connection between the tube 9 and proximity switch 7 constitutes the sealing element 10 which seals off the tube 9 hermetically.

The arrangement according to the invention operates, for example, as follows:

After the positioning of the proximity switch 7, the vacuum space 4 and consequently the bellows 5 are evacuated, so that the latter assumes its working position evident from FIG. 2. The distance between the bellows 5 and proximity switch 7 then corresponds to the clearance B which is larger than the clearance A. The clearance B must be of a size such that the proximity switch 7 does not respond. When the bellows 5 expands due to a leak in the vacuum space 4 and to a pressure rise caused thereby, it can be lengthened up to its initial position, evident from FIG. 1, in which its distance from the proximity switch 7 corresponds to the clearance A. The switching distance of the proximity switch 7 or the response threshold of the vacuum monitoring is thereby achieved.

As soon as the proximity switch 7 has detected that the bellows 5 has expanded as described, it transmits a signal to the evaluation unit 8. This signal may be merely indicated in the evaluation unit 8. It may also lead to the triggering of an alarm or be fed to an overriding process control, by means of which the operation of the pipeline can be discontinued automatically.

The positioning of the proximity switch 7 in the direction of movement of the bellows 5 has the further advantage that, in the case of a very high pressure rise in the arrangement, an overexpansion and consequently a destruction of the bellows 5 can be prevented. A corresponding movement of the bellows 5 is then stopped by the proximity switch 7 when the bellows 5 comes to bear with its end face against the latter.

The invention claimed is:

1. Arrangement for monitoring the leak-tightness of an evacuated space which is hermetically closed, leak-tight, by means of at least one metallic wall, in which is inserted a device which is connected to the evacuated space and which indicates an inadmissible pressure rise in the evacuated space caused by a leak in the wall, and in which the device comprises:
    a metallic bellows, which is hermetically connected, leak-tight, to the evacuated space; and an electrical proximity switch to which an evaluation unit is connected, wherein
    the proximity switch is mounted, in the direction of movement of the bellows, at a distance from the end face of the latter, the size of which is varied as a function of the respective axial length of the bellows, and wherein
    a tube connected fixedly to the wall is mounted around the bellows, so as to maintain an air gap, surrounds the bellows in a moisture-tight manner and is longer than the bellows in its longest initial position corresponding to the expanded state, and wherein
    the proximity switch projects into the tube so as to be sealed off with respect to the latter.

2. Arrangement according to claim 1, wherein the proximity switch is mounted in a position, of which the distance from the bellows is defined by the length of the latter which it has in the initial position corresponding to its expanded state.

3. Arrangement according to claim 1, wherein the proximity switch is screwed into the tube provided with an internal thread.

* * * * *